United States Patent

Ichiyanagi et al.

[11] Patent Number: 5,889,094
[45] Date of Patent: Mar. 30, 1999

[54] RESIN COMPOSITION OF PROPYLENE-ETHYLENE RANDOM COPOLYMER

[75] Inventors: Kenji Ichiyanagi; Masayuki Yamazaki, both of Kawasaki, Japan

[73] Assignee: Tonen Chemical Corporation, Tokyo, Japan

[21] Appl. No.: 871,580

[22] Filed: Jun. 9, 1997

Related U.S. Application Data

[63] Continuation-in-part of Ser. No. 701,707, Aug. 22, 1996, abandoned.

[30] Foreign Application Priority Data

Aug. 23, 1995 [JP] Japan .................................. 7-237619

[51] Int. Cl.⁶ ...................................................... C08K 5/49
[52] U.S. Cl. .......................... 524/117; 524/437; 524/394; 524/399
[58] Field of Search ................................. 524/117, 437, 524/394, 399

[56] References Cited

U.S. PATENT DOCUMENTS

| | | | |
|---|---|---|---|
| 5,342,868 | 8/1994 | Kimura et al. | 524/108 |
| 5,356,567 | 10/1994 | Ogawa et al. | 252/400.1 |
| 5,360,859 | 11/1994 | Ogawa et al. | 524/437 |
| 5,419,883 | 5/1995 | Ogawa et al. | 423/122 |

FOREIGN PATENT DOCUMENTS

| | | |
|---|---|---|
| 0446358 | 9/1991 | European Pat. Off. . |
| 0549340 | 6/1993 | European Pat. Off. . |
| 0622404 | 11/1994 | European Pat. Off. . |
| A 5630449 | 3/1981 | Japan . |
| A 5825341 | 2/1983 | Japan . |
| A 5156078 | 6/1993 | Japan . |
| A 5179052 | 7/1993 | Japan . |

Primary Examiner—Peter D. Mulcahy
Attorney, Agent, or Firm—Sughrue, Mion, Zinn, Macpeak & Seas, PLLC

[57] ABSTRACT

A resin composition of propylene-ethylene random copolymer comprising (a) a propylene-ethylene random copolymer, (b) at least one alkali salt selected from the group consisting of alkali carboxylates, alkali β-diketonates and alkali salts of β-ketacetate, (c) an organophosphoric compound, and (d) a lithium aluminum compound. The organophosphoric compound is represented by the following formula (I):

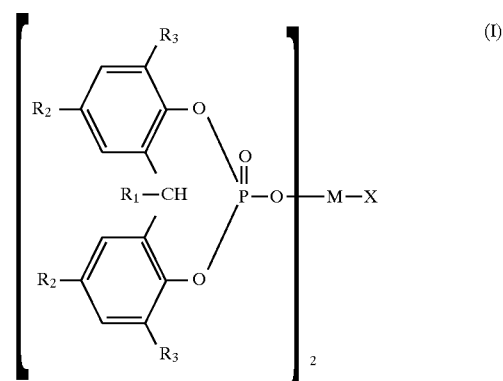

wherein $R_1$ is hydrogen or an alkyl group having 1 to 4 carbon atoms, each of $R_2$ and $R_3$ is independently hydrogen or an alkyl group having 1 to 12 carbon atoms, M is a metal atom of an element selected from the group consisting of Group III, IV, XIII and XIV elements of the Periodic Table, and X is —OH when M is a metal atom of an element of Group III or XIII of the Periodic Table or X is =O or (—OH)$_2$ when M is a metal atom of an element of Group IV or XIV of the Periodic Table, and the lithium aluminum compound is represented by the following formula (II):

$$[Al2Li(OH)_6]_n Y . mH_2O \qquad (II)$$

wherein Y is an inorganic or organic anion, n is a charge of Y and m is a number of 3 or less.

4 Claims, No Drawings

RESIN COMPOSITION OF PROPYLENE-ETHYLENE RANDOM COPOLYMER

CROSS-REFERENCE TO RELATED APPLICATION

This application is a continuation-in-part of application Ser. No. 08/701,707, filed Aug. 22, 1996, now abandoned.

BACKGROUND OF THE INVENTION

The present invention relates to a resin composition of propylene-ethylene random copolymer, more specifically a resin composition of propylene-ethylene random copolymer excellent in transparency, heat resistance and mechanical strength, and suitable for producing food containers, medical wares, laboratory wares, etc.

Polypropylene resin has been widely used as the material for injection molding, film production, sheet production, blow molding, etc. because polypropylene resin has relatively good heat resistance, chemical resistance and stiffness, and has good electrical properties and workability. A propylene-ethylene random copolymer produced from propylene and a small amount of ethylene further has a high impact strength and a good transparency in addition to the above properties of polypropylene resin. However, the transparency of propylene-ethylene random copolymer is still insufficient to apply it to food containers, medical wares, laboratory wares, etc., thereby limiting the use of propylene-ethylene random copolymer.

To improve on the transparency, it has been proposed to add to a polypropylene-type resin composition a nucleating agent such as a metal salt of carboxylic acid, a metal salt of aromatic sulfonic acid, a metal salt of aromatic phosphoric acid, a sorbitol compound (JP-A-58-25341 and JP-A-56-30449). Among these nucleating agents, the sorbitol derivative has been known most effective for improving the transparency. However, the sorbitol compound involves problems of low heat resistance and stiffness as well as offensive odor, bleedout, etc. Therefore, it has been expected that the polypropylene-type resin composition could be widely applied to various fields if such problems are solved.

OBJECT AND SUMMARY OF THE INVENTION

Accordingly, an object of the present invention is to provide a resin composition of propylene-ethylene random copolymer excellent in transparency.

As a result of the intense research in view of the above objects, the inventors have found that the transparency can be improved by adding, into a propylene-ethylene random copolymer, particular amounts of an alkali salt, an organophosphoric compound and a lithium aluminum compound, all of which are specified below. The inventors have further found that the addition of the alkali salt, the organophosphoric compound and the lithium aluminum compound exhibits a synergistic effect of unexpectedly improving the heat resistance and the mechanical strength of the propylene-ethylene random copolymer. The present invention has been accomplished based on this finding.

Thus, in a first aspect of the present invention, there is provided a resin composition of propylene-ethylene random copolymer comprising (a) 100 parts by weight of a propylene-ethylene random copolymer having an ethylene content of 0.5–7 weight %, (b) 0.01–5 parts by weight of at least one alkali salt selected from the group consisting of alkali carboxylates, alkali β-diketonates and alkali salts of β-ketacetates, (c) 0.01–5 parts by weight of at least one organophosphoric compound represented by the following formula (I):

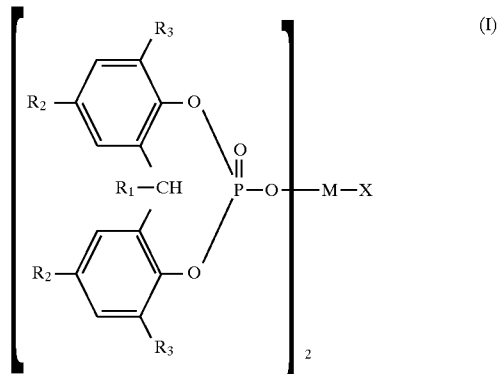

wherein $R_1$ is hydrogen or an alkyl group having 1 to 4 carbon atoms, each of $R_2$ and $R_3$ is independently hydrogen or an alkyl group having 1 to 12 carbon atoms, M is a metal atom of an element selected from the group consisting of Group III (IIIA), IV (IVA), XIII (IIIB), and XIV (IVB) elements of the Periodic Table, and X is —OH when M is a metal atom of an element of Group III (IIIA) or XIII (IIIB) of the Periodic Table or X is =O or (—OH)$_2$ when M is a metal element of an element of Group IV (IVA) or XIV (IVB) of the Periodic Table, and (d) 0.01–0.5 parts by weight of at least one lithium aluminum compound represented by the following formula (II):

$$[Al_2Li(OH)_6]_n \cdot Y \cdot mH_2O \tag{II}$$

wherein Y is an inorganic or organic anion, n is a charge of Y and m is a number of 3 or less.

The above group designation of M is expressed according to the group designation adopted by the IUPAC with the traditional group designation in parentheses.

DETAILED DESCRIPTION OF THE INVENTION

The present invention will be described below more in detail.

(a) Propylene-ethylene random copolymer

The propylene-ethylene random copolymer used in the present invention consisting essentially of propylene and ethylene. The ethylene content in the propylene-ethylene random copolymer is 0.5–7 weight %, preferably 2–5 weight %. An ethylene content lower than 0.5 weight % results in a poor impact strength, whereas an ethylene content exceeding 7 weight % deteriorates the stiffness and heat resistance of the resin composition.

The melt flow rate (MFR), measured at 230° C. under a load of 2.16 kg, of the propylene-ethylene random copolymer is preferably 0.2–5 g/10 min, more preferably 0.5–2 g/10 min.

The production method of the propylene-ethylene random copolymer is not restricted, and may be produced by a gas phase polymerization where propylene and ethylene simultaneously supplied are polymerized over a stereo-specific polymerization catalyst.

The stereo-specific polymerization catalyst may include a two-component catalyst consisting of a transition metal component and an organometallic component, and a three-component catalyst consisting of the above two components and an electron donating compound containing nitrogen, phosphorus, sulfur, oxygen, silicon, etc. The transition metal component may be a halogenated titanium compound such as titanium trichloride, titanium tetrachloride, ethoxytitanium trichloride, etc., and a contact product of the halogenated titanium compound and a magnesium compound such as a magnesium halide. The organometallic component may be an alkylaluminum compound which may be a halide, hydride or alkoxide.

(b) Alkali salt

The alkali salt used in the present invention is at least one selected from the group consisting of (i) alkali carboxylates, (ii) alkali β-diketonates and (iii) alkali salts of β-ketacetates. These are salts between an alkali metal such as lithium, sodium, potassium, etc. and a carboxylic acid, β-diketone or β-ketacetate, and may be produced by known methods.

As the carboxylic acid for the alkali carboxylate (i), exemplified are aliphatic monocarboxylic acids such as acetic acid, propionic acid, acrylic acid, octyl acid, nonanoic acid, decanoic acid, lauric acid, myristic acid, palmitic acid, stearic acid, oleic acid, ricinoleic acid, 12-hydroxystearic acid, behenic acid, montanic acid, melissic acid, β-dodecylmercaptopropionic acid, β-N-laurylaminopropionic acid, β-N-methyl-N-laurylaminopropionic acid, etc.; aliphatic polycarboxylic acids such as malonic acid, succinic acid, adipic acid, maleic acid, azelaic acid, sebasic acid, dodecanedicarboxylic acid, citric acid, butanetricarboxylic acid, butanetetracarboxylic acid, etc.; alicyclic mono- or polycarboxylic acids such as naphthenic acid, cyclopentanecarboxylic acid, 1-methylcyclopentanecarboxylic acid, 2-methylcyclopentanecarboxylic acid, cyclopentenecarboxylic acid, cyclohexanecarboxylic acid, 1-methylcyclopentenecarboxylic acid, cyclohexenecarboxylic acid, 4-cyclohexene-1,2-dicarboxylic acid, etc.; and aromatic mono- or polycarboxylic acids such as benzoic acid, toluic acid, xylylic acid, salicylic acid, phthalic acid, trimellitic acid, etc.

The β-diketone for the alkali β-diketonate (ii) may include acetylacetone, pivaloylacetone, palmitoylacetone, benzoylacetone, pivaloylbenzoylacetone, dibenzoylmethane, etc.

The β-ketacetate for the alkali salt of β-ketacetate (iii) may include ethyl acetoacetate, octyl acetoacetate, lauryl acetoacetate, stearyl acetoacetate, ethyl benzoylacetate, lauryl benzoylacetate, etc.

Of the above alkali salts, alkali salts of aliphatic monocarboxylic acids are preferable, and lithium salts of aliphatic monocarboxylic acids are more preferable. Of the aliphatic monocarboxylic acids, those having 8 to 20 carbon atoms are preferred.

(c) Organophosphoric compound

The organophosphoric compound used in the present invention is represented by the following formula (I):

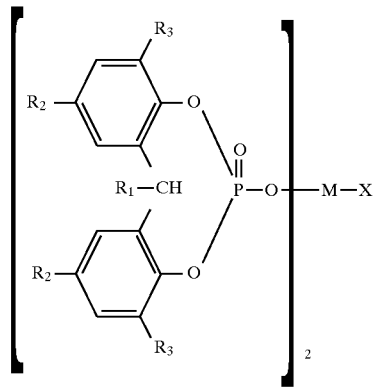

wherein $R_1$ is hydrogen or an alkyl group having 1 to 4, preferably hydrogen or methyl, each of $R_2$ and $R_3$ is independently hydrogen or an alkyl group having 1 to 12, preferably methyl or t-butyl, M is a metal atom of an element selected from the group consisting of Group III, IV, XIII and XIV elements of the Periodic Table, and X is —OH when M is a metal atom of Group III or XIII element of the Periodic Table or X is =O or (—OH)$_2$ when M is a metal atom of Group IV or XIV element of the Periodic Table. At least one of the compounds of the formula (I) is used in the resin composition of the present invention.

M in the formula (I) is exemplified by aluminum, gallium, germanium, sin, titanium, zirconium, etc., and preferably aluminum.

The specific examples of the organophosphoric compound may include the following compounds (1) to (6) which are described in U.S. Pat. No. 5,342,868.

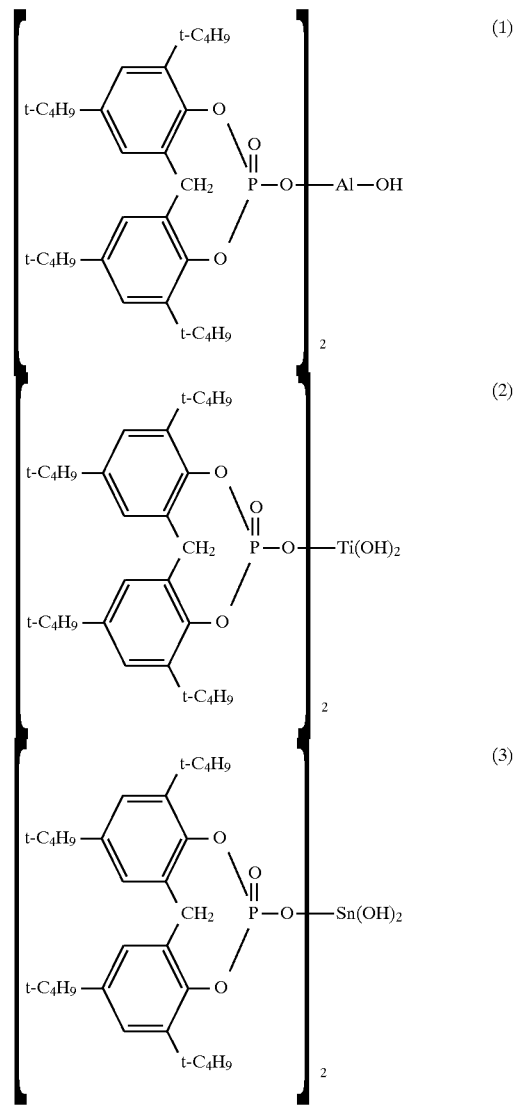

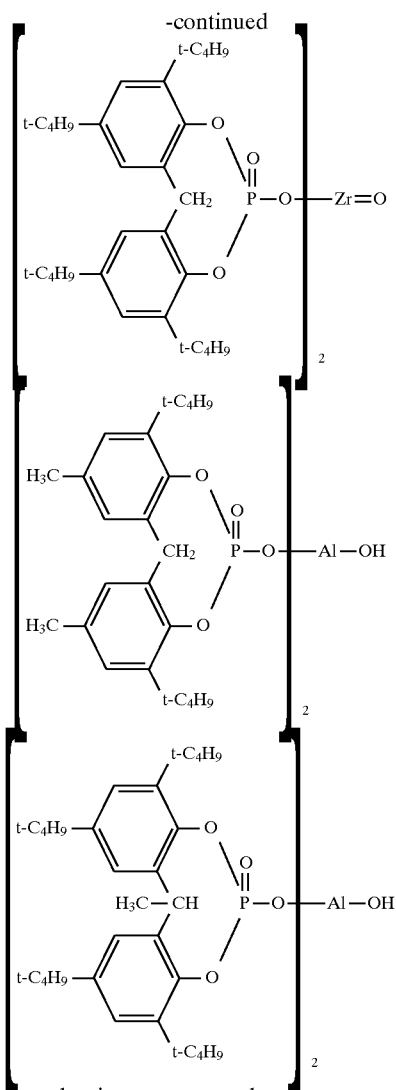

(d) Lithium aluminum compound

The lithium aluminum compound used in the present invention is represented by the following formula (II):

$$[Al_2Li(OH)_6]_n Y \cdot mH_2O \quad (II)$$

wherein Y is an inorganic or organic anion, n is a charge of Y and m is a number of 3 or less.

As the inorganic or organic anion represented by Y in the formula (II), exemplified are anions derived from carbonic acid, sulfuric acid, oxyacid of chlorine such as perchloric acid, oxyacid of phosphorus such as phosphoric acid, phosphorous acid and metaphosphoric acid, acetic acid, propionic acid, adipic acid, benzoic acid, phthalic acid, terephthalic acid, maleic acid, fumalic acid, succinic acid, p-hydroxybenzoic acid, salicylic acid, picric acid, etc. Y man by one or a combination of two or more of these anions. Preferred anions are those derived from carbonic acid, sulfuric acid, oxyacids of chlorine and oxyacids of phosphorus.

The lithium aluminum compounds described above are disclosed in U.S. Pat. No. 5,356,567.

(e) Other additives

The resin composition of propylene-ethylene random copolymer of the present invention may contain, according to its use, other additives within an amount not departing from the purpose of the present invention. Examples for such additives may include granulates, powders or scales of silica, alumina, talc, mica, clay, kaolin, wollastonite, zeolite, silica-alumina, calcium carbonate, aluminum hydroxide, titanium dioxide, zinc oxide, magnesium oxide, zirconium oxide, zinc sulfide, barium sulfate, calcium sulfate, calcium phosphate, magnesium phosphate, aluminum silicate, silicon nitride, glass, hydrotalcite, etc. Other examples may include inorganic fillers such as glass fiber, potassium titanate fiber, carbon fiber, carbon black, graphite, mica ceramics fiber, metal fiber, etc. with or without being subjected to surface treatment with a silane coupling agent, titanate coupling agent, boron coupling agent, aluminate coupling agent or zircoaluminate coupling agent; organic fillers such as wood powder, pulp, synthetic fiber, natural fiber, etc.; antioxidants of phenol type, thioether type or phosphorus type; light stabilizers; clarifiers; nucleating agents such as organic carboxylic acids and metal salts thereof; lubricants; antistatic agents; anti-fogging agents; anti-blocking agent; pigments; heavy metal deactivators; radical initiators such as peroxides; dispersants such as metallic soap; etc.

The components (b) to (d) described above are blended to 100 weight parts of the propylene-ethylene random copolymer in an amount of 0.01–5 weight parts, preferably 0.1–0.5 weight parts for the alkali salt (b), 0.01–5 weight parts, preferably 0.1–0.5 weight parts for the organophosphoric compound (c), and 0.01–0.5 weight parts, preferably 0.01–0.2 weight parts for the lithium aluminum compound (d).

When the blended amount of each of the components (b) to (d) is lower than the above lower limit, any of the heat resistance, stiffness and transparency is low. On the other hand, a blended amount of each of the components (b) to (d) exceeding the above upper limit exhibits no additional effect. In addition of this, the addition of excess amount of the components (b) to (d) is disadvantageous in view of production cost because they are expensive compounds.

The weight ratio of the components (b), (c) and (d) ((b):(c):(d)) is preferably 1:0.3–3:0.1–5.

The resin composition of propylene-ethylene random copolymer of the present invention may be produced by blending the above components in Henschel mixer, super mixer, ribbon blender, etc. and then melt-kneading at 170°–300° C. in a single-screw extruder, twin-screw extruder, Banbury mixer, Brabender, roll, etc. Masterbatching may be also applicable. The kneaded product then may be extruded into granulates or pellets.

The present invention will be further described while referring to the following Examples which should be considered to illustrate various preferred embodiments of the present invention.

EXAMPLES 1 to 4

1. Starting Material (1) Propylene-ethylene random copolymer (RPP)
  Ethylene content: 3 weight %
  Melt flow rate (MFR): 1.5 g/10 min
(2) Alkali salt
  Lithium stearate.
(3) Organophosphoric compound
  Organophosphoric compound represented by the formula (1).
(3) Lithium aluminum compound
  $[Al_2Li(OH)_6]_2CO_3 \cdot 1.6H_2O$
(4) Antioxidant
  Phenol-type antioxidant: "Irganox 1010" (trade name) manufactured by Ciba-Geigy (Japan) Limited.
  Phosphorus-type "Irgaphos 168" (trade name) manufactured by Ciba-Geigy (Japan) Limited.

2. Kneading

A mixture of 100 weight parts of the above propylene-ethylene random copolymer (RPP), 0.05 weight parts of each of the above phenol-type antioxidant and phosphorus-type antioxidant, and respective amounts of the mixture of alkali salt (compound (b)), organophosphoric compound (compound (c)) and the lithium aluminum compound (compound (d)) as shown in Table 1 were blended in Henschel mixer. Then blended product was melt-kneaded in a single-screw extruder (outer diameter: 50 mm) at 230° C. for 30 minutes to 5 hours. The kneaded product was extruded from a die into pellets under conditions of a die temperature of 230° C., a screw rotation number of 60 rpm, and an extruder output of 20 kg/h.

3. Molding

The pellets thus obtained were injection-molded by an injection molding machine under the conditions of resin temperature of 210° C., injection pressure of 400 kgf/cm$^2$ and mold temperature of 30° C. to prepare each specimen.

4. Measurement of Properties

The properties of each specimen were measured according to the following methods. The results are shown in Table 1.
(1) Haze value (%): Measured according to ASTM D1003-61 on a specimen of 1 mm thick.
(2) Odor: The presence of odor was evaluated by sensory test according to the standards of X for offensive odor and ○ for no odor.

TABLE 1

|  | Example No. | | | |
| --- | --- | --- | --- | --- |
|  | 1 | 2 | 3 | 4 |
| Composition |  |  |  |  |
| RPP |  |  |  |  |
| Amount (wt. parts) | 100 | 100 | 100 | 100 |
| Ethylene content (wt. %) | 3 | 3 | 3 | 3 |
| Amount of additives (wt. parts) |  |  |  |  |
| Compound (b) | 0.1 | 0.15 | 0.1 | 0.1 |
| Compound (c) | 0.1 | 0.05 | 0.1 | 0.05 |
| Compound (d) | 0.05 | 0.1 | 0.025 | 0.05 |
| Properties |  |  |  |  |
| Haze value (%) | 9.4 | 9.2 | 9.3 | 9.9 |
| Odor | ○ | ○ | ○ | ○ |

Comparative Example 1

The same procedures as in Example 1 were repeated except for blending 0.1 weight part of calcium stearate (CaSt) in place of the compound (d). The results are shown in Table 2.

Comparative Example 2

The same procedures as in Example 1 were repeated except for blending 0.1 weight part of calcium stearate (CaSt) and 0.2 weight parts of 1,3:2,4-di(p-methylbenzylidene)sorbitol ("Gelall MD" (trade name) manufactured by Shin Nippon Rika K.K.) in place of the compounds (b), (c) and (d). The results are shown in Table 2.

Comparative Example 3

The same procedures as in Example 1 were repeated except for blending, as the additives, 0.05 weight parts of the compound (d) and 0.2 weight part of 1,3,2,4-di(p-methylbenzylidene)sorbitol used in Comparative Example 2. The results are shown in Table 2.

TABLE 2

|  | Comparative Example No. | | |
| --- | --- | --- | --- |
|  | 1 | 2 | 3 |
| Composition |  |  |  |
| RPP |  |  |  |
| Amount (wt. parts) | 100 | 100 | 100 |
| Ethylene content (wt. %) | 3 | 3 | 3 |
| Amount of additives (wt. parts) |  |  |  |
| Compound (b) | 0.1 | — | — |
| Compound (c) | 0.1 | — | — |
| Compound (d) | — | — | 0.05 |
| MBS[(1)] | — | 0.2 | 0.2 |
| CaSt | 0.1 | 0.1 | — |
| Properties |  |  |  |
| Haze value (%) | 13.1 | 11.7 | 11.1 |
| Odor | ○ | x | x |

Note: [(1)]1,3:2,4-di(p-methylbenzylidene)sorbitol

As seen from the above results, the resin composition of propylene-ethylene random copolymer of the present invention showed a low haze value, namely, superior in transparency. On the other hand, the resin composition of Comparative Example 1 was poor in transparency because it contained no salt of lithium aluminum compound hydroxide. Although the resin compositions of Comparative Examples 2 and 3 showed a somewhat high transparency, offensive odor resulted from the added sorbitol derivative.

To demonstrate the synergistic effect of the lithium aluminum compound with the alkali salt and the organophosphoric compound, the following Comparative Tests 1 to 3 were conducted.

Comparative Tests 1 to 3

Each specimen was prepared in the same manner as in Examples 1 to 4 except for using the respective composition shown in Tables 3 to 5.

The properties of each specimen were measured according to the following methods.

(1) Flexural modulus (kgf/cm$^2$): Measured according to JIS K 7203 on a specimen of 110 mm long×10 mm wide×4 mm thick.
(2) Thermal deformation temperature (°C.): Measured according to JIS K 7207 on a specimen of 127 mm long×12.7 mm wide×4 mm thick.
(3) Izod impact strength (kg.cm/cm$^2$): Measured according to JIS K 6758 at 20° C.
(4) Haze value (%): Measured according to JIS K 7105 on a specimen of 1 mm thick.

TABLE 3

Comparative Test 1

| | Test No. | | | |
|---|---|---|---|---|
| | 1 | 2 | 3 | 4 |
| Composition | | | | |
| (a) RPP | | | | |
| Ethylene content: 3% by weight | | | | |
| MFR: 1.5 g/10 min | | | | |
| Amount (parts by weight) | 100 | 100 | 100 | 100 |
| (b) Alkali salt | | | | |
| Lithium stearate | | | | |
| Amount (parts by weight) | 0 | 0.15 | 0 | 0.15 |
| (c) Organophosphoric compound | | | | |
| Formula (1) | | | | |
| Amount (parts by weight) | 0 | 0.05 | 0 | 0.05 |
| (d) Lithium aluminum compound | | | | |
| $[Al_2Li(OH)_6]_2CO_3 \cdot 1.6H_2O$ | | | | |
| Amount (parts by weight) | 0 | 0 | 0.1 | 0.1 |
| Properties | | | | |
| Flexural modulus (kgf/cm$^2$) | 6970 | 8000 | 6950 | 8820 |
| Thermal deformation temperature (°C.) | 76 | 75 | 72 | 79 |
| Izod impact strength (kg.cm/cm$^2$ at °C.) | 7.0 | 10.0 | 7.0 | 17.6 |
| Haze value (%) | 24.7 | 9.5 | 25 | 9.2 |

From the comparison between Test No. 1 and Test No. 2, the addition of the alkali salt and the organophosphoric compound was found to considerably improve the transparency and moderately improve the mechanical strength. The comparison between Test No. 1 and Test No. 3 showed that the sole addition of the lithium aluminum compound was ineffective for improving the mechanical strength of the propylene-ethylene random copolymer. However, as seen from the comparison between Test No. 2 and Test No. 4, the lithium aluminum compound exhibited, in the presence of the alkali salt and the organophosphoric compound, a considerable improvement of the mechanical strength.

By adding each additive to another propylene-ethylene random copolymer in a different amount as shown in Table 4, the same procedure as in Comparative Test 1 was repeated.

TABLE 4

Comparative Test 2

| | Test No. | | | |
|---|---|---|---|---|
| | 5 | 6 | 7 | 8 |
| Composition | | | | |
| (a) RPP | | | | |
| Ethylene content: 5.4% by weight | | | | |
| MFR: 1.3 g/10 min | | | | |
| Amount (parts by weight) | 100 | 100 | 100 | 100 |
| (b) Alkali salt | | | | |
| Lithium stearate | | | | |
| Amount (parts by weight) | 0 | 0.05 | 0 | 0.05 |
| (c) Organophosphoric compound | | | | |
| Formula (1) | | | | |
| Amount (parts by weight) | 0 | 0.1 | 0 | 0.1 |
| (d) Lithium aluminum compound | | | | |
| $[Al_2Li(OH)_6]_2C_3 \cdot 1.6H_2O$ | | | | |
| Amount (parts by weight) | 0 | 0 | 0.025 | 0.025 |
| Properties | | | | |
| Flexural modulus (kgf/cm$^2$) | 5000 | 6100 | 5090 | 6750 |
| Thermal deformation temperature (°C.) | 64 | 69 | 64 | 75 |
| Izod impact strength (kg.cm/cm$^2$ at 20 °C.) | 9.4 | 12.3 | 9.1 | 18.5 |
| Haze value (%) | 25 | 15 | 23 | 10 |

The results of Comparative Test 2 showed a similar tendency found in Comparative Test 1, namely, the lithium aluminum compound exhibited a considerable improvement of the mechanical strength when the alkali salt and the organophosphoric compound existed.

Further by adding each additive to another propylene-ethylene random copolymer in a different amount as shown in Table 5, the same procedure as in Comparative Test 1 was repeated.

TABLE 5

Comparative Test 3

| | Test No. | | | |
|---|---|---|---|---|
| | 9 | 10 | 11 | 12 |
| Composition | | | | |
| (a) RPP | | | | |
| Ethylene content: 2.5% by weight | | | | |
| MFR: 1.5 g/10 min | | | | |
| Amount (parts by weight) | 100 | 100 | 100 | 100 |
| (b) Alkali salt | | | | |
| Lithium stearate | | | | |
| Amount (parts by weight) | 0 | 0.3 | 0 | 0.3 |
| (c) Organophosphoric compound | | | | |
| Formula (1) | | | | |
| Amount (parts by weight) | 0 | 0.5 | 0 | 0.5 |
| (d) Lithium aluminum compound | | | | |
| $[Al_2Li(OH)_6]_2C_3 \cdot 1.6H_2O$ | | | | |
| Amount (parts by weight) | 0 | 0 | 0.3 | 0.3 |
| Properties | | | | |
| Flexural modulus (kgf/cm$^2$) | 8300 | 9500 | 8500 | 10500 |
| Thermal deformation temperature (°C.) | 76 | 80 | 78 | 85 |
| Izod impact strength (kg.cm/cm$^2$ at 20° C.) | 4.2 | 6.6 | 4.5 | 9.0 |
| Haze value (%) | 40 | 18 | 37 | 10.5 |

The results of Comparative Test 3 also showed a similar tendency found in Comparative Test 1, namely, the lithium aluminum compound exhibited a considerable improvement of the mechanical strength when the alkali salt and the organophosphoric compound existed.

As described above, since the propylene-ethylene random copolymer is blended with the alkali salt, the organophosphoric compound and the lithium aluminum compound, the resin composition of the present invention is superior in transparency. For example, the shaped articles made of the composition has a haze value of 10.5% or less. Further, the composition is free from offensive odor resulted from the additives. In addition, the lithium aluminum compound unexpectedly improves the mechanical strength of the propylene-ethylene random copolymer by a synergistic effect with the alkali salt and the organophosphoric compound. Such a resin composition of propylene-ethylene random copolymer is widely applicable to food containers, medical wares, laboratory wares, etc.

What is claimed is:

1. A resin composition of propylene-ethylene random copolymer comprising
   (a) 100 parts by weight of a propylene-ethylene random copolymer having an ethylene content of 0.5–7 weight %,
   (b) 0.01–5 parts by weight of at least one alkali salt selected from the group consisting of alkali carboxylates, alkali β-diketonates and alkali salts of β-ketacetates,
   (c) 0.01–5 parts by weight of at least one organophosphoric compound represented by the following formula (I):

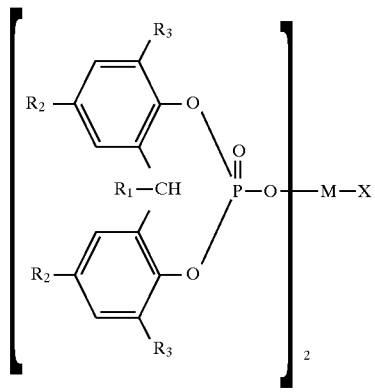

wherein $R_1$ is hydrogen or an alkyl group having 1 to 4 carbon atoms, each of $R_2$ and $R_3$ is independently hydrogen or an alkyl group having 1 to 12 carbon atoms, M is a metal atom of an element selected from the group consisting of Group III, IV, XIII and XIV elements of the Periodic Table, and X is —OH when M is a metal atom of an element of Group III or XIII of the Periodic Table or X is =O or (—OH)$_2$ when M is a metal atom of an element of Group IV or XIV of the Periodic Table, and (d) 0.01–0.5 parts by weight of at least one lithium aluminum compound represented by the following formula (II):

wherein Y is an inorganic or organic anion, n is a charge of Y and m is a number of 3 or less.

2. The resin composition according to claim 1, wherein the amount of said alkali salt is 0.1–0.5 parts by weight.

3. The resin composition according to claim 1, wherein the amount of said organophosphoric compound is 0.1–0.5 parts by weight.

4. The resin composition according to claim 1, wherein the amount of said lithium aluminum compound is 0.05–0.2 parts by weight.

* * * * *